April 7, 1959

S. B. WILLIAMS 2,880,972

ROTARY REGENERATOR SEALING STRUCTURE

Filed Dec. 20, 1954

INVENTOR.
Samuel B. Williams.
BY
ATTORNEYS.

April 7, 1959          S. B. WILLIAMS          2,880,972
ROTARY REGENERATOR SEALING STRUCTURE
Filed Dec. 20, 1954          6 Sheets-Sheet 2

INVENTOR.
Samuel B. Williams
BY
ATTORNEYS

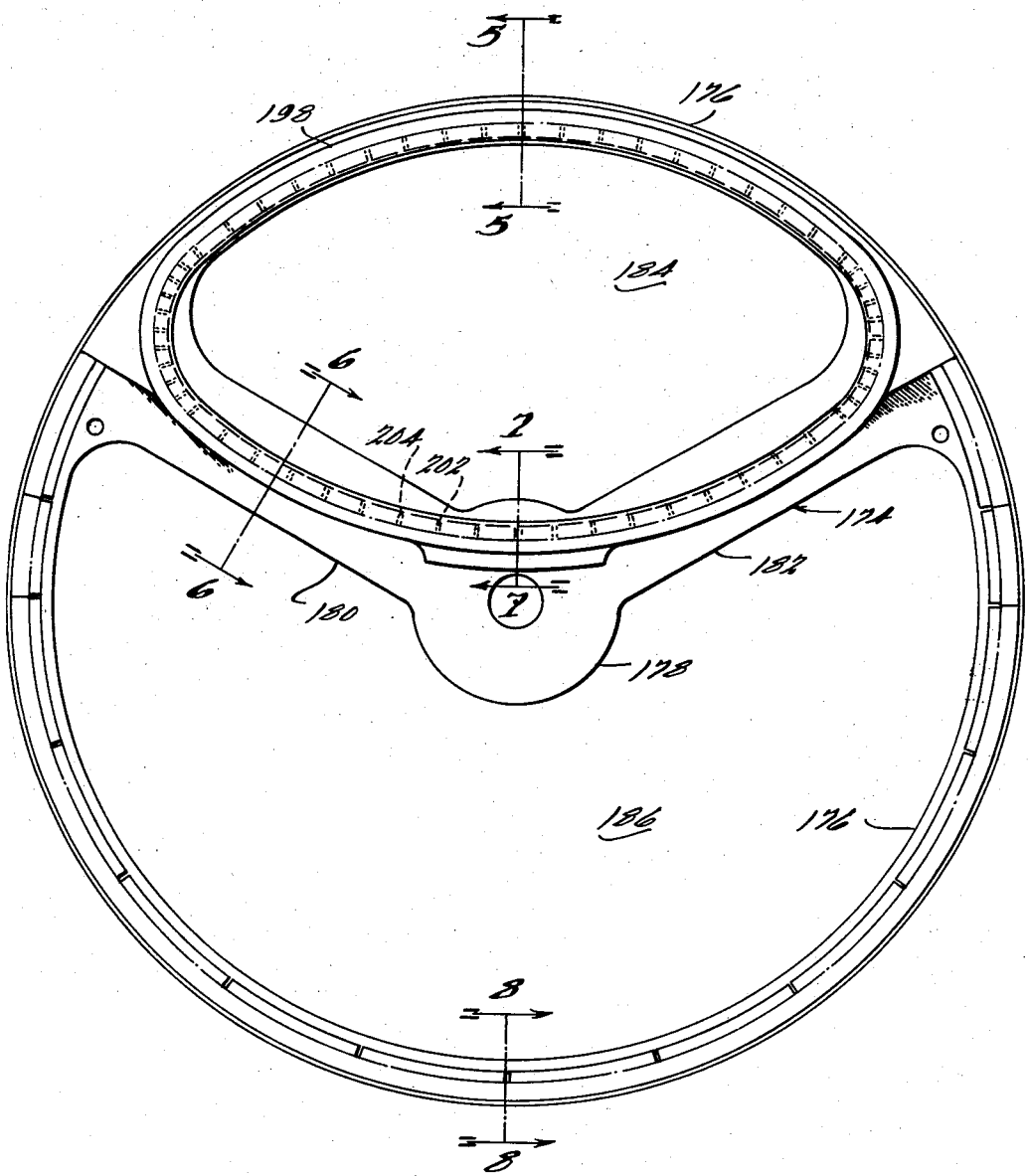

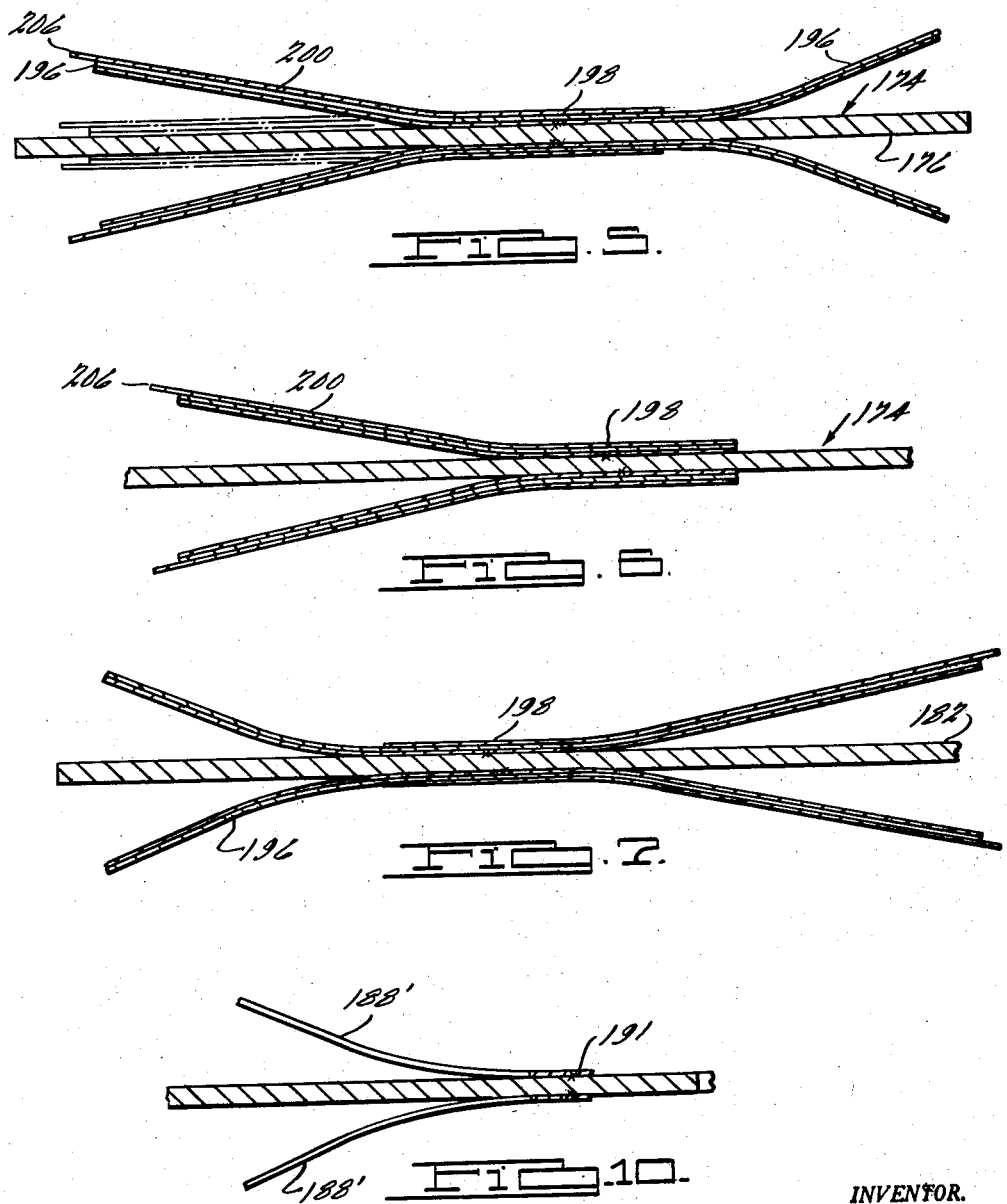

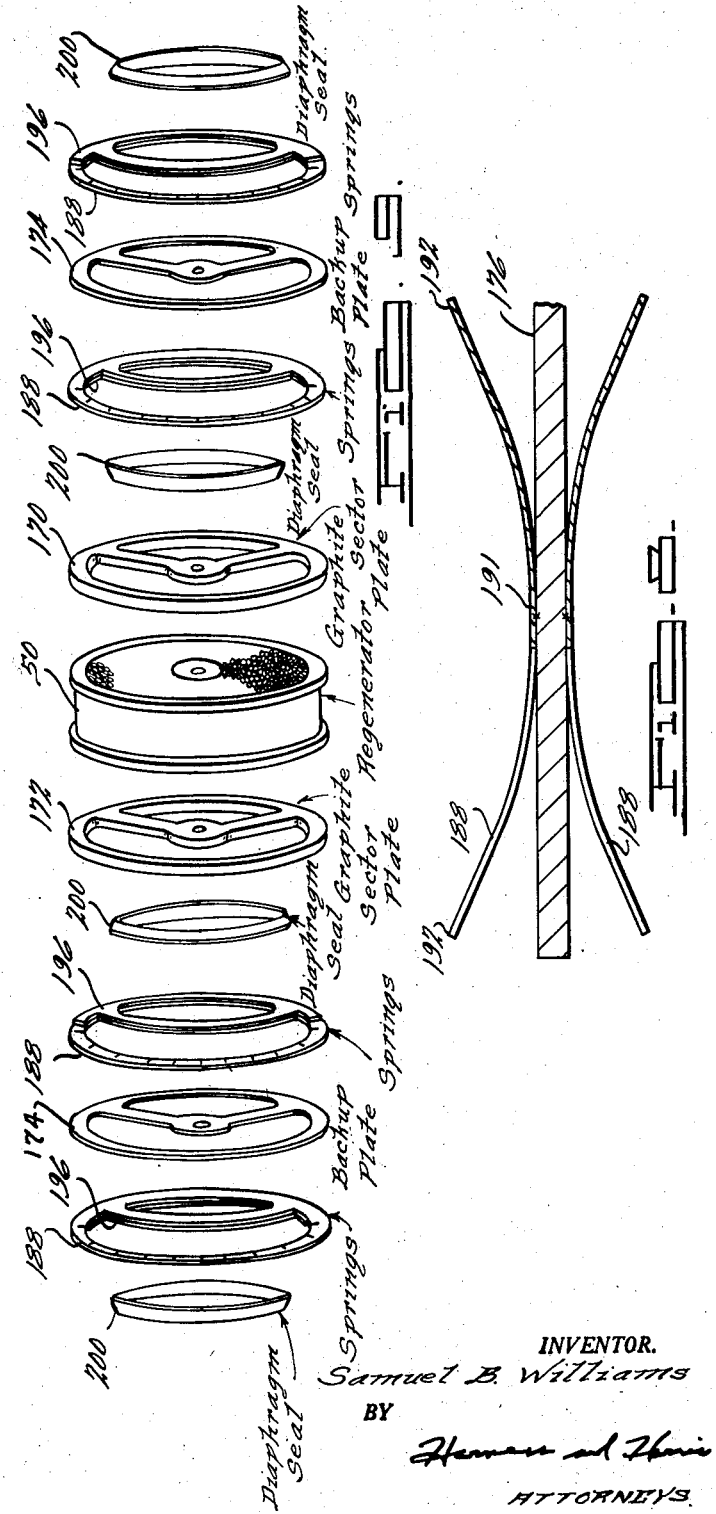

United States Patent Office 2,880,972
Patented Apr. 7, 1959

2,880,972

ROTARY REGENERATOR SEALING STRUCTURE

Samuel B. Williams, Birmingham, Mich., assignor to Chrysler Corporation, Highland Park, Mich., a corporation of Delaware Application December 20, 1954, Serial No. 476,176

21 Claims. (Cl. 257—6)

My instant invention relates generally to gas turbine power plants or other fuel combustion apparatus and to rotary regenerator mechanisms for use therewith. More particularly, my invention is concerned with a new and improved means for sealing rotary regenerator mechanisms to eliminate an undesirable bypassing of the gases flowing through separate portions of the matrix thereof, the gases flowing through one matrix portion being at a different temperature and pressure than the temperature and pressure of the gases flowing through the other portion.

My invention is especially adapted to be used in combination with the rotary regenerator of the gas turbine power plant disclosed in the copending application of George J. Huebner, Samuel B. Williams, and David M. Borden, Serial No. 389,094, filed October 29, 1953, now Patent No. 2,795,928, which is assigned to the assignee of my instant invention, and reference may be had thereto for the purpose of supplementing my instant disclosure.

Although the sealing structure of my instant invention is capable of being used with a large variety of different fuel combustion apparatus employing a regenerative combustion cycle, I have presently disclosed one preferred structural environment for my invention which comprises a compact gas turbine power plant of the automotive type, the regenerator structure therefor including a circular matrix which is rotatably mounted about a central hub portion. The circular regenerator matrix in the disclosed power plant structure is mounted within a cast power plant housing which encloses the other component elements of the power plant. These other component elements of the power plant include a rotary compressor which is capable of receiving fuel combustion supporting air through suitable intake air ducts extending to the exterior of the power plant housing. The compressor discharges the intake air at an increased total pressure into a suitable diffuser structure which conducts the air to an air intake chamber defined by the upper portion of the cast housing structure, said diffuser effecting a reduction in the velocity pressure of the compressed intake air and an increase in the static pressure.

The regenerator matrix structure may be disposed below the above mentioned intake chamber in adjacent relationship therewith and the compressed intake air may pass through sector-like openings formed in the power plant housing on either side of the regenerator matrix and through a first portion of the regenerator matrix into a passage means communicating with the fuel combustion chamber, the passage of pressurized intake air through said regenerator being confined to said first matrix portion. The above mentioned passage means may be defined by internal baffle structure within the power plant housing. Liquid fuel may be mixed with the air in the fuel combustion chamber and the high temperature gases produced by the fuel combustion process are conducted through other suitable baffling to an annular gas passage within which the bladed peripheries of a two-stage turbine wheel assembly are disposed, the turbine wheels associated with the separate turbine stages being disposed in a central portion of the power plant housing. The turbine wheel associated with the first turbine stage is drivably coupled to the rotary compressor unit, above described, and the turbine wheel associated with the second turbine stage is drivably connected to the power input member of a speed reduction transmission, said transmission also being mounted within the power plant housing to form a complete, compact automotive power plant. Each of the turbine wheels is powered by the motive gases passing through the annular gas passage. A suitable drive means may be provided for drivably coupling the first turbine stage with the rotary regenerator matrix to impart a rotary motion to the latter during operation of the power plant.

The high temperature combustion gases are exhausted into a chamber within the power plant housing, said chamber being situated below a second rotary regenerator matrix portion at a location which is displaced from the aforementioned first regenerator matrix portion. Second sector-like openings are formed in the power plant housing on either side of the regenerator matrix and they are adapted to accommodate the passage of the hot combustion exhaust gases through said second matrix portion into an exhaust chamber defined by the upper portion of the power plant housing, said exhaust chamber communicating with a suitable exhaust gas outlet passage.

The hot exhaust gases are effective to heat the second regenerator matrix portion to an elevated temperature, and as the matrix portion is rotated about its central axis, the heated portion is brought into contact with the relatively cool compressed intake air to effect a transfer of thermal energy from the hot to the cool gases. When the same matrix portion is again brought into contact with the heated exhaust gases upon continued rotation of the regenerator, a transfer of thermal energy again takes place from the exhaust gas to the matrix structure and the temperature of the latter again rises as the cycle is repeated. The regenerator matrix thus serves as a vehicle for transferring thermal energy from the hot combustion exhaust gases to the relatively cool compressed intake air, and the thermal efficiency of the power plant is correspondingly increased.

To prevent an undesirable and wasteful bypassing or short-circuiting of the gases as they are conducted through the above-described circuit during operation, to confine the compressed intake air flow through the regenerator to the above-mentioned first matrix portion and to confine the flow of relatively hot combustion gases to the above-mentioned second matrix portion, I have provided a new and improved regenerator sealing structure which may be disposed between the rotary surfaces of the regenerator matrix structure and the relatively stationary power plant housing within which the regenerator is rotatably mounted, as above described. More specifically, the improved sealing structure of my instant invention includes a sealing element or sector plate disposed in sliding, sealing engagement with the rotary regenerator matrix structure on either side thereof, said sector plates having first and second sector-like openings which partly define a compresesd intake air passage and an exhaust gas passage respectively. A first diaphragm type sealing element is disposed about the periphery of the first sector-like openings of each of the sector plates with the inner margin thereof in sealing engagement with its associated sector plate. The diaphragm type sealing element is secured to one side of a relatively rigid back-up plate which is similar in shape to the sector plate, one such back-up plate being disposed on either side of the regenerator matrix structure. A second diaphragm type sealing element may be secured to the other side of each back-up plate in juxtaposed relationship with respect to the first diaphragm type sealing element, the inner margins of the second sealing elements being in sealing engagement with the housing. The several diaphragm type sealing elements define a bellows-like structure which is urged into sealing engagement with the sector plates and the stationary housing by the high pressure gases passing through the above-mentioned first regenerator matrix portion.

In addition, the sealing structure of my present invention includes peripheral leaf type springs which encircle the first sector plate openings and which are superimposed by the diaphragm type sealing elements, the latter being biased into engagement with the adjacent sector plates by the associated peripheral springs. Similarly, other peripheral leaf type spring means may be secured to the backup plates and disposed about at least a portion of each of the second sector plate openings for the purpose of biasing the sector plates into sliding contact with the regenerator matrix structure in the vicinity of the above-mentioned first matrix portion. This other peripheral leaf spring means further functions as an effective seal for preventing a bypassing of the hot exhaust gases around the above-mentioned second matrix portion.

Although various means have been heretofore employed in the heat exchanger art for effecting a seal between a rotary regenerator element and a stationary regenerator casing, I am aware of no sealing structure which might be used for effectively sealing a rotary regenerator matrix for a gas turbine power plant or the like in which the combustion gases assume relatively high temperatures, in which the pressure differential between the combustion chamber intake air and the exhaust gases is high, and in which the regenerator matrix is of a relatively large diameter.

Regenerator rotors of this type are necessarily characterized by a tendency to warp into an irregular shape which aggravates the normally difficult sealing problem and which causes relatively large interstices to appear between the sealing element and the stationary housing. When such a regenerator rotor employs a sealing structure of known construction, the accompanying intermixing of the cool gases and the hot exhaust gases reduces the thermal efficiency of the power plant and increases the air horsepower requirements of the turbine driven intake air compressor. I have observed that known types of peripheral sealing elements are incapable of providing effective sealing between the cool and hot gases when the pressure ratio between the same is relatively high, but even at low pressure ratios the sealing characteristics of these conventional sealing elements are usually below those standards required by a regenerator mechanism for an automotive power plant. Accordingly, the provision of a new and improved sealing structure for a rotary regenerator of the type briefly described above being a principal object of my invention, it is a further object of my invention to provide a peripheral sealing means for a rotary regenerator unit which is effective to provide effective sealing during high temperature operation when a substantial amount of warping occurs.

It is a further object of my invention to provide a peripheral sealing structure which is particularly adapted to be used with a rotary regenerator mechanism for a gas turbine power plant wherein the temperature and pressure differential between the combustion chamber intake and exhaust gases is appreciably high.

It is a further object of my invention to provide a new and improved sealing structure for a rotary regenerator of the type above described wherein means are provided for effecting a sealing contact with the periphery of the regenerator structure while operating at a relatively high ratio between the pressures of the cool gas and the hot exhaust gases, the peripheral sealing pressure exerted against the rotating regenerator increasing upon an increase in pressure ratio.

A further object of my present invention is to provide a new and improved peripheral sealing structure of the type set forth in the preceding objects which is further characterized by its improved wear properties, by its high corrosion resistance during operation at high temperatures, by its relatively low frictional drag between the sliding surface of the stationary sealing structure and the adjacent rim portion of the regenerator matrix, and by its relatively simple construction.

It is a further object of my instant invention to provide a power plant sealing structure of the type set forth above which may be readily fabricated by known production techniques.

It is a further object of my invention to provide a peripheral sealing structure for use with a rotary regenerator matrix for an automotive power plant which is characterized by its improved sealing characteristics under all operating conditions of the power plant and by its relatively long operating life.

Other objects and advantages will readily become apparent from the following description and the accompanying drawings, wherein:

Figure 4 is a plan view of the regenerator sealing structure of my instant invention;

Figure 5 is a sectional view of the sealing structure of Figure 4 taken along section line 5—5 of Figure 4;

Figure 6 is a transverse sectional view of the sealing structure of Figure 4 taken along the section line 6—6 of Figure 4;

Figure 7 is a transverse sectional view of the sealing structure of Figure 4 taken along the line 7—7 of Figure 4;

Figure 8 is a transverse sectional view of the sealing structure of Figure 4 taken along section line 8—8 of Figure 4;

Figure 9 is an exploded view showing the various components of the sealing structure of my instant invention in axially spaced relationship; and Figure 10 is a sectional view of a portion of a modified form of the sealing structure of my instant invention.

Figure 1:
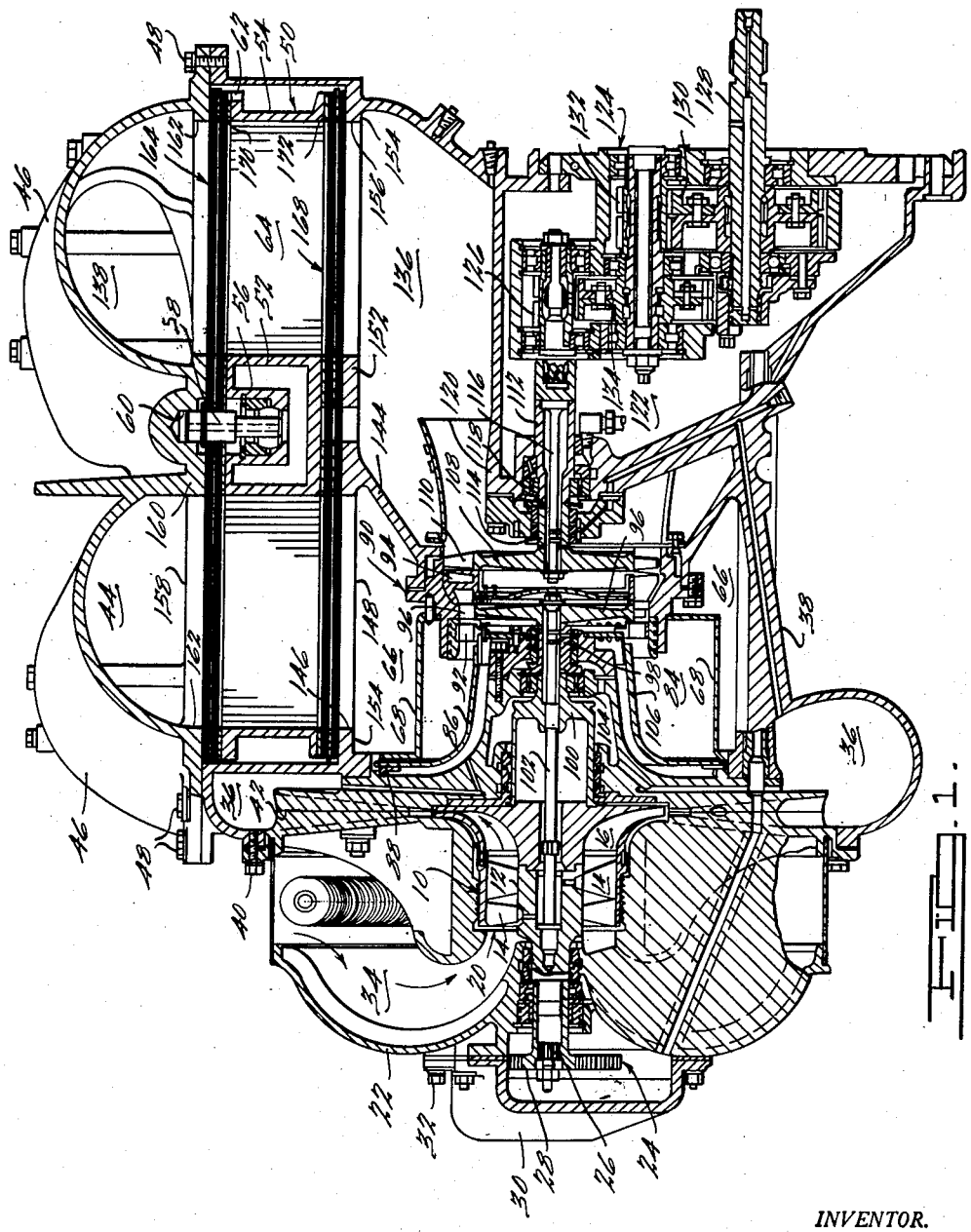
Figure 1 is a cross sectional assembly view of an automotive type gas turbine power plant having a rotary regenerator mechanism and incorporating the regenerator sealing structure of my instant invention.

Referring first to the assembly view of Figure 1, an intake air compressor rotor is shown by means of numeral 10 and it includes a hub portion 12 with radially extending inducer blades 14 and working blades 16. The rotor hub 12 includes an extension 18 which is rotatably journalled at 20 in an end housing cover 22. Accessory drive gears 24 are drivably connected to the rotor extension 18 by means of a splined connection 26 between an accessory drive input gear 28 and the extension 18. A suitable cover plate 30 may be provided for enclosing the accessory drive gears 24, said cover plate 30 being bolted to the housing cover 22 by means of bolts 32.

The end housing cover 22 defines an outwardly extending intake air passage 34 having a reverse configuration as shown. The radially inward portion of the passage 34 communicates with the air inducer passage of compressor rotor 10 within which inducer blades 14 are disposed. Upon rotation of the compressor rotor 10 about its central axis, intake air is caused to flow in a generally inward direction through the passage 34 and is then caused to pass in an axial direction through the inducer blades 14. The air is then discharged radially through the blades 16 and is collected in a substantially spiral-shaped diffuser chamber 36, said diffuser chamber 36 being defined by the power plant cast housing portion 38. It may be observed that the end housing portion 22 is bolted about its outer periphery by means of bolts 40 to the cast housing portion 38 and is effective to partly define the radially inward portion of the diffuser chamber 36, the parting line between the casting housing portions 28 and 32 being shown at 42.

The diffuser chamber 36 is substantially spiral in shape and it progresses about the central axis of the rotor 10 with a progressively increasing cross sectional area and terminates in a dome-shaped cavity 44 located on the upper portion of the power plant housing assembly, said cavity being defined by an upper housing cover 46 which is bolted to the cast housing portion 38 about its outer periphery as shown at 48.

As intake air is discharged into the diffuser chamber 36, the static pressure thereof increases to a maximum value as it collects in cavity 44. A rotary regenerator mechanism is shown in the upper portion of cast housing 38 and it includes a disc-like matrix structure 50 which comprises a circular hub 52 and a rim 54, the hub 52 being rotatably mounted by means of a bearing 56 to a shaft 58 which is received at one end thereof within an opening 60 formed in the center section of the upper housing cover 46. The rim 54 may be provided with a suitable driving means such as a ring gear 62 for rotating the regenerator mechanism about the axis of shaft 58. A power transmission means, not shown, may be provided for drivably connecting the gears 24 with the ring gear 62 for powering the latter at a predetermined speed.

A body portion 64 of the disc-like matrix structure 50 comprises a pervious material having axially extending passages which are effective to conduct gases from one axial side thereof to the other. One typical construction, as described in the copending application of George J. Huebner et al. Serial No. 389,094 now Patent No. 2,795,928, above mentioned, comprises alternate layers of flat sheets and corrugated sheets which are wound about the hub 52 and which define a disc-like core. The individual sheets may be formed into an integral assembly by a suitable brazing operation, and the rim 54 may likewise be secured about the periphery of the core by a brazing operation. The alternately spaced corrugated sheets define the above-mentioned axially extending passages through the core body 64.

The compressed intake air may pass from the chamber 44 in a downward direction, as viewed in Figure 1, through the regenerator core 64 into a chamber 66 disposed in part directly below the regenerator matrix structure 50. Suitable baffling 68 and a burner tube 69 are provided for conducting the air from the chamber 66 to a region 70 surrounding a vertically disposed burner cone 72, the baffling 68 being joined to the burner tube 69 to define an enclosure about which gases within the chamber 66 are adapted to circulate. The air may be admitted from the region 70 to the interior of the burner cone 72 through a plurality of apertures 74 and it may be mixed with liquid fuel introduced by an atomizing nozzle 76 which extends into the burner cone 72. The fuel and air mixture may be ignited by a suitable igniter means 78 and the combustion gases may pass in a substantially downward direction, as viewed in Figure 2, through the burner tube 69. The housing for the above described burner structure comprises a vertically disposed cylindrical extension 80 formed on one side of the power plant housing portion 38. A burner cap 82 may be bolted upon the upper surface of the housing extension 80 for the purpose of enclosing the burner cone 72 and to provide a means of access for servicing the same.

Figure 2:
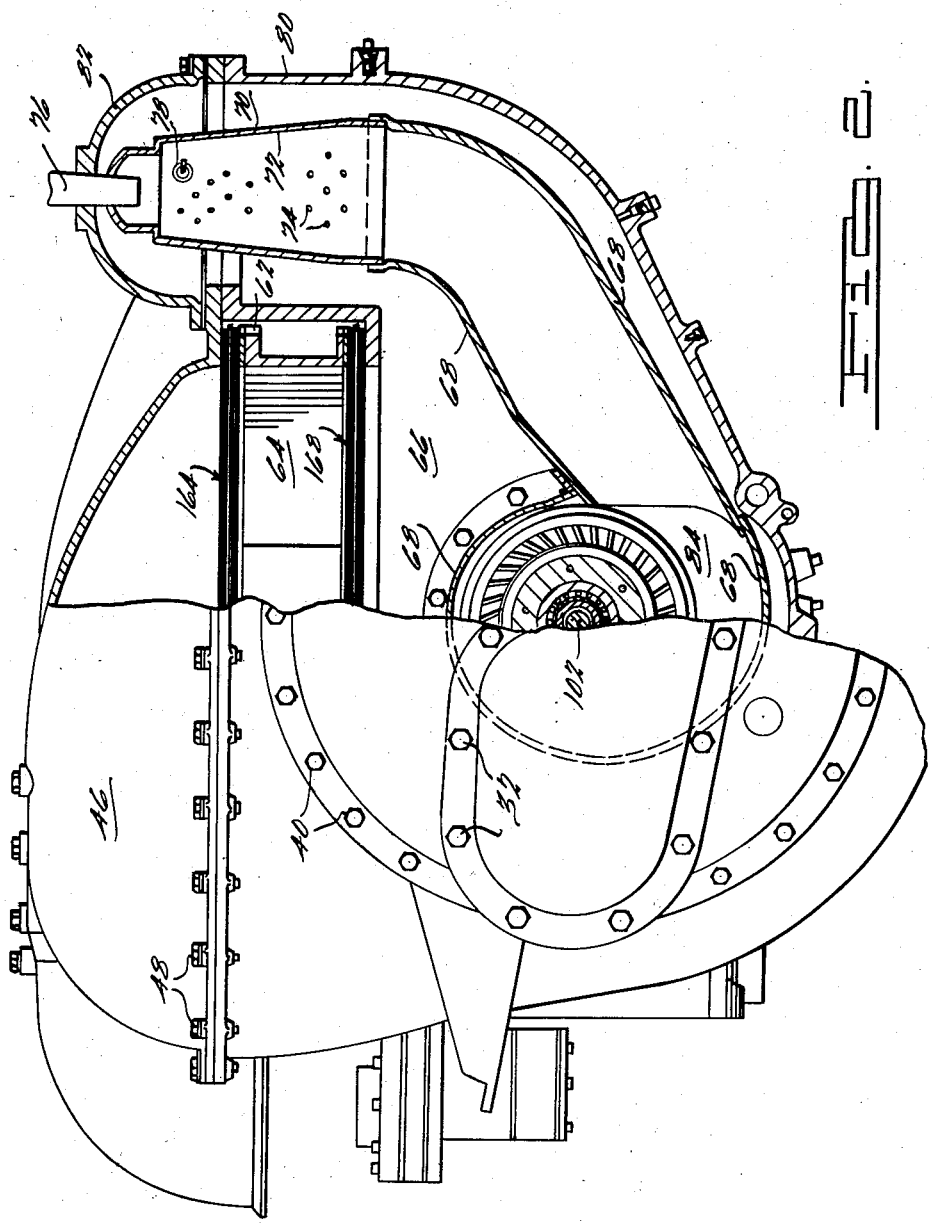
Figure 2 is a transverse sectional view of the power plant assembly of Figure 1.

Upon reaching the lower extremity of the burner tube 69, the combustion gases enter a spiral-shaped chamber 84 defined by the centrally situated baffling 68, as best seen in Figure 2, the axis of the spiral chamber 84 substantially corresponding to the axis of the compressor rotor 10. The spiral-shaped chamber 84 is further partly defined by a circular baffle 86 which includes an axially extending portion concentrically disposed about the axis of the rotor 10 and which further includes a radially extending portion secured at its outer periphery to the cast housing portion 38, as shown at 88. As the gases enter the chamber 84, they are caused to pass axially through an annular passageway partly defined by a nozzle block assembly designated generally by numeral 90. The nozzle block assembly may be adapted to retain a first ring of stator blades 92 and a second ring of stator blades 94. A first stage turbine wheel 96 may be situated within the nozzle block assembly 90 and the peripheral blades thereof, shown at 96, may be disposed between stator blades 92 and 94 in adjacent relationship therewith. A first spacer element 98 and a second spacer element 100 are interposed between the turbine wheel 96 and the hub 12 of the compressor rotor 10, and a turbine shaft 102 is provided for securing the turbine wheel 96, the spacers 98 and 100 and the rotor hub 12 in axially stacked relationship to form a unitary assembly which may rotate as a unit about a common axis of rotation. A bearing 104 is provided, as shown, for rotatably journalling the turbine wheel and rotor assembly within a housing extension 106.

A second stage turbine wheel is shown at 108 and it is provided with peripheral blades 110 which are situated adjacent the stator blades 94 in adjacent relationship therewith. A pair of turbine wheel spacer elements is shown at 112 and 114, and the turbine wheel 108, together with these spacer elements 112 and 114, may be held in axially stacked relationship by means of turbine shaft 116, and the entire assembly may be rotatably journalled by means of bearing 118 in an apertured wall portion 120 of the cast housing portion 38.

The wall portion 120 is adapted to define an enclosure 122 within which a speed reduction transmission mechanism 124 may be disposed, said transmission mechanism comprising an input gear assembly 126 drivably connected to the turbine shaft 116 and a power output shaft 128 situated in a lower portion of the enclosure 122. The power output shaft 128 may be conveniently coupled to a vehicle drive shaft for a conventional automotive vehicle and it is drivably connected at its inner portion to the input gear 126 by intermediate gears 130, 132 and 134.

The combustion gases may pass from the chamber 84 through the annular passageway defined by the nozzle block assembly 90 and into an exhaust chamber 136 disposed below the regenerator matrix structure 50. The exhaust gases may then pass from the chamber 136 through the axially extending passages in the regenerator core into a dome-like exhaust chamber 138 defined by the power plant housing cover 46. A suitable exhaust conduit, not shown, may be provided for conducting the exhaust gases from the chamber 138 to a suitable external opening, not shown.

Figure 3:
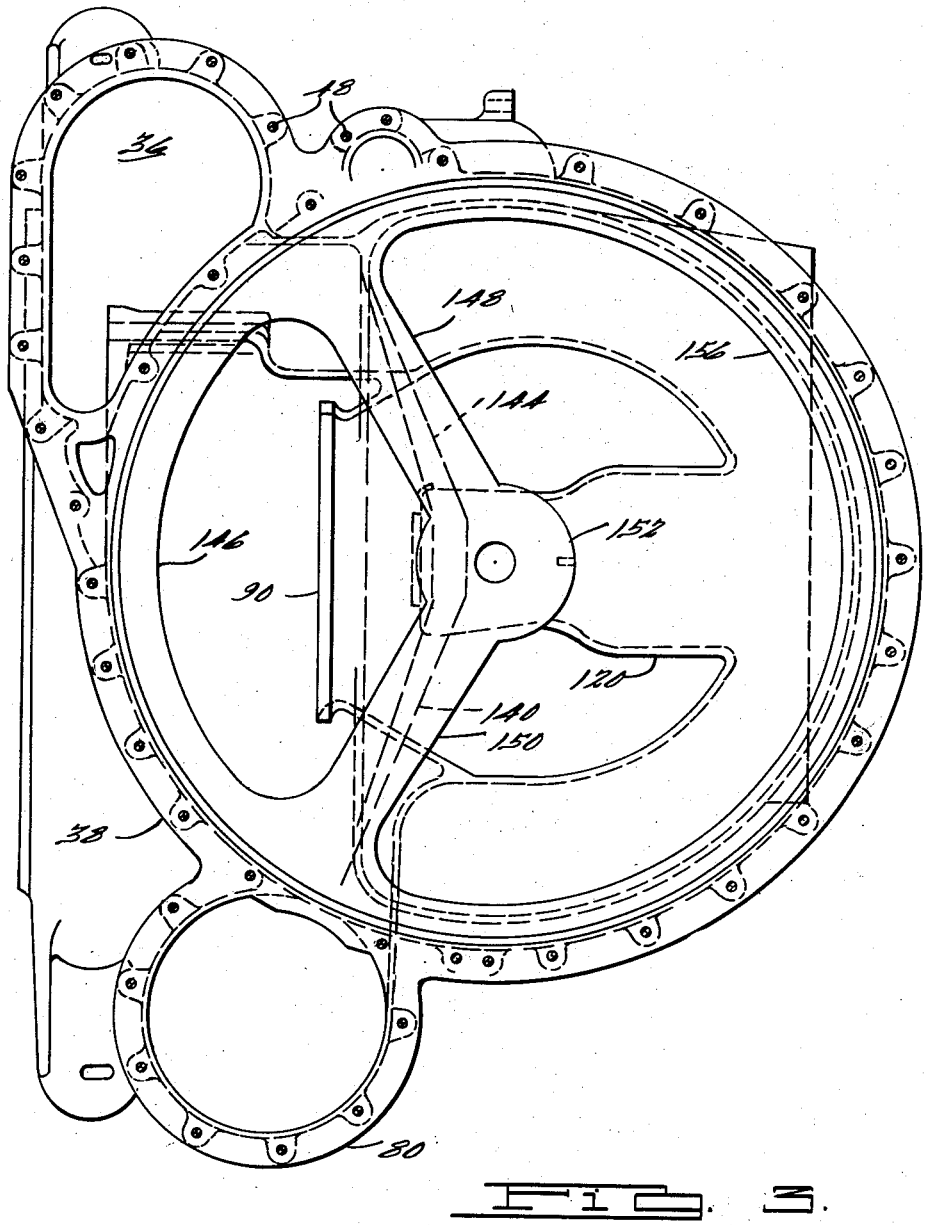
Figure 3 is a plan view of a portion of the power plant housing shown in Figure 1.

It will be apparent from an inspection of Figure 3 that the exhaust chamber 136 defines a considerably greater volume than the aforementioned chamber 66 and it is separated therefrom by wall structure 140 and 144, said wall structure further providing a means for supporting the aforementioned nozzle block assembly 90 in a central position within the power plant housing portion 38. It will also be apparent that the regenerator matrix core 64 is exposed to the chamber 66 through a sector-shaped opening identified in Figures 1, 2 and 3 by numeral 146, said opening being partly defined by sector arms 148 and 150 which interconnect a central circular hub 152 with a peripheral shoulder 154 formed about the interior of the power plant housing portion 38, said shoulder 154, the hub 152 and the sector arms 148 and 150 being situated in a common horizontal plane. The regenerator matrix core 64 is exposed to the exhaust chamber 136 over a considerably large area which is shown in Figures 1, 2 and 3 by means of numeral 156.

The housing cover 46 is similarly provided with a pair of sector arms, one being shown in Figure 1 at 158, which extend from a central hub 160 to a peripheral ring or shoulder 162. These sector arms are similarly effective to define a pair of sector-like openings which are similar in shape to the above-described openings 146 and 156, said openings respectively providing communication between a portion of the regenerator matrix core 54 and the chamber 44 and between exhaust chamber 138 and another portion of the regenerator matrix core 64.

As best seen in Figures 1 and 2, a peripheral sealing structure 164 is interposed between the periphery 54 of the regenerator matrix structure 50 and the peripheral shoulder 162 formed on the housing cover 46. Similarly, another peripheral sealing structure 168 may be interposed between the rim 54 of the matrix structure 50 and the peripheral shoulder 154 formed about the interior of the housing cast portion 38. As best seen in Figure 4, the sealing structure is substantially similar in shape to the horizontal surface defined by the peripheral shoulder 154, the hub 152 and the sector arms 148 and 150 previously described. The two sealing structures 164 and 168 are substantially identical in construction and they each include a sector plate shown at 170 and 172 respectively, said plates being adapted to slidably contact the axial sides of the peripheral rim 54 and the axial sides of the hub 52 of the matrix structure 50.

Referring next to Figure 4, each of the sealing structures 164 and 168 includes a backup plate 174 which is substantially identical in shape to the above described sector plates 170 and 172 and which includes a peripheral rim 176, a hub 178 and sector arms 180 and 182, said sector arms defining a first opening 184 and a relatively larger second opening 186. When assembled, the sector arms 180 and 182 are disposed in juxtaposed relationship with respect to the sector arms 148 and 150 of the cast housing portion 38, and the rim 176 is situated directly over the annular shoulder 154 formed about the interior of the cast housing portion 38. By preference, backup plate 174 is formed of stainless steel.

As best seen in Figures 4 and 8, the peripheral rim 176 partly defining the opening 186 has secured thereto a circular leaf-type spring 188. The center portion of the spring 188 may be secured at 191 to the peripheral rim 176 of the backup plate 174 by means of spot welding or any other suitable means and each of the lateral sides 190 and 192 of the spring 188 assumes an unloaded position similar to that shown in Figure 8. For one operative embodiment of my invention in which the inside diameter of the circular spring 188 is about 18½", the free height of the sides 190 and 192 is about .080" and the radius of curvature of the spring 188 may be about ½". Similarly, a spring which is identical to the above-described spring 188 may be secured to the other side of the peripheral portion 176 of the backup plate 174 as seen in Figure 8.

As best seen in Figures 4 and 5, the peripheral portion 176 of the backup plate 174 which surrounds the sector opening 184 has secured thereto a double leaf spring 196 which is adapted to encircle the opening 184 to define a substantially elliptical spring structure. The center portion of the leaf spring 196 may be suitably secured to the peripheral rim 176 of the backup plate 174 by a suitable welding operation or the like, the numeral 198 being used to designate a suitable location for the welds. When viewed in Figure 4, the location 198 defines a ring which encloses the opening 184.

The outer edge portions of the double leaf spring 196 may be provided with an initial unloaded curvature of about ½" and its unloaded free height may be substantially the same as that of spring 188 above described. One side of the leaf spring 196 may be superimposed over an elliptical sealing diaphragm 200 which encircles the sector opening 184 as shown in Figure 4. The outer peripheral edge of the sealing diaphragm 200 may be secured at center portion 198 of the double leaf spring 196 to the backup plate 174. According to one embodiment of my invention in which the inside diameter of the spring element is about 18½", the initial curvature of the inside portion of the double leaf spring 196, which appears at the left side of location 198 as viewed in Figure 5, is preferably provided with an initial curvature of about ¾" prior to the assembly of the sealing diaphragm 200 while the outside portion of the spring 196, which appears at the right side of location 198 as viewed in Figure 5, is preferably provided with an initial curvature of about ½". Also the free height of the inside margin of the spring 196 prior to the assembly of the diaphragm seal 200 may be about .125 inch while the free height of the outside margin may be about .080 inch.

The individual leaves of the double leaf spring 196 may be segmented as shown at 202 and 204 respectively. The segments 202 and one of the spring leaves of the double leaf spring 196 are formed at a plurality of spaced locations about the opening 184 and the segments 204 formed on the other spring leaf of the double leaf spring 196 are also formed at a plurality of spaced locations about the sector opening 184 but they are each displaced circumferentially from the adjacent segments 202, so that the spaces between the segments 202 and 204 are staggered with respect to each other.

After the assembly of the sealing diaphragm 200, the inner portion of the assembled double leaf spring 196 assumes a generally flat shape as shown in Figure 5, since the unstressed sealing diaphragm 200 is formed with a generally flat contour. The inner edge 206 of the flat sealing diaphragm 200 extends beyond the inner edge of the double leaf spring 196 and is displaced from the plane of the backup plate as shown.

As best seen in Figure 5, one of the double leaf springs 196 and one of the sealing diaphragms 200 are secured to either side of the backup plate 174, the spring and diaphragm assembly on one side of the backup plate 174 being the mirror image of the spring and diaphragm assembly on the other side.

As best seen in Figures 4 and 6, the portion of the leaf spring and sealing diaphragm assembly on the inside of the location 198, which is disposed adjacent the sector arms 180 and 182, extends only toward the interior of the sector opening 184. By preference the other side of the double leaf spring 196 is eliminated.

As best seen in Figure 7, the portion of the leaf spring and sealing diaphragm assembly which is secured to either side of the sector plate hub portion 178 includes, in addition to the inwardly extending double leaf spring and diaphragm assembly 196 and 200, a leaf spring extension which extends outwardly from the center of sector opening 184. This spring extension, which appears on the left side of Figure 7 is similar to the outwardly extending portion of the spring 196 appearing at the right side of Figure 5.

A modified form of the sealing structure of my instant invention may include a single leaf peripheral spring of the type shown in Figure 10, which corresponds to the above-described peripheral spring 188 illustrated in Figure 8. According to the modified form of Figure 10, the leaf spring identified by numeral 188' extends toward the interior of the sector opening 186 but does not include an outwardly extending edge portion as in the construction of Figure 8. The springs 188' may be secured to either side of the peripheral portion 176 of the backup plate 174 by means of spot welding or other suitable fastening means at the location 191. As in the spring structure of Figure 8, the spring 188' of Figure 10 is disposed about the larger sector opening 186.

In assembling the sealing structure of my instant invention in a gas turbine power plant having a rotary type regenerator of the type above described, one complete assembly of the type shown in Figure 4 may be positioned on either axial side of the regenerator 64, the edge 206 of one sealing diaphragm 200 resting on the shoulder 154 formed about the inner periphery of the cast power plant housing portion 38 and the edge 206 of a second sealing diaphragm for the other assembly contacting the shoulder 162 formed on the power plant cover member 46 as shown in Figure 1.

The sector plates 170 and 172 are disposed in sliding contact with either side of the peripheral rim 54 of the regenerator structure 50, and the above-described spring and sealing diaphragm assembly is interposed between the shoulder 154 and sector plate 172 and between the shoulder 162 and sector plate 170. Sector plates 170 and 172 are formed of a graphite material which is specially treated to retard oxidation and it is characterized by its highly desirable heat resistant and wear resistant properties. Sector plates 170 and 172 are formed with a shape which is substantially identical to that of the above-described backup plate 174 and they each include a central hub portion, a peripheral portion and two sector arms which interconnect the hub portion and the peripheral portion, the sector arms for the sector plates being in juxtaposed relationship with respect to sector arms 180 and 182 for the backup plate 174.

The graphite sector plates 170 and 172 are formed with a thickness which is sufficiently thin to allow a substantial amount of deflection during operation of the power plant. For example, the central hub 52 of the regenerator structure 50 may undergo a substantial amount of thermal deflection or warpage during operation at high temperatures which will cause a certain amount of axial movement of the hub portion 52 with respect to the rim portion 54. Similarly, the hub portion 152 of the cast housing portion 38 may be subjected to a considerable amount of distortion with respect to the peripheral shoulder 154 formed about the interior of the cast housing portion 38. These thermal distortions are caused by temperature gradients and unequal heat distribution within the regenerator structure and the cast power plant housing. If desired, the upper surface of the shoulder 154 in the housing 38 may be tapered downwardly toward the hub portion 152 in order to accommodate the thermal distortion or dishing of the regenerator matrix 64. By preference the outer leaf of the spring leaf 196 is formed of stellite while the other spring leaf, the peripheral springs of Figures 8 and 10 and the diaphragm seals are formed of stainless steel. The thickness of the individual spring leaf may be approximately .002 inches.

The graphite sector plates 170 and 172 are held in a stationary position and are biased into a sliding, sealing engagement with the peripheral rim 54 of the regenerator structure 50, the sector plates being biased with a uniform pressure by the double leaf peripheral springs 196 and the peripheral springs 188 or 188', as appropriate.

For the purpose of providing a better understanding of the relative position of the various components of the sealing structure of my instant invention, reference may be had to the exploded view of Figure 9 wherein the regenerator structure 50 is shown in the center of the figure and wherein one sealing assembly is shown on the right side, and the other sealing assembly is shown on the left side. Each of the graphite sector plates 170 and 172 is situated directly adjacent regenerator structure 50 and the sealing diaphragm 200 is disposed directly above the smaller sector opening of the sector plates 170 and 172. The sealing springs 196 and 188 are shown in Figure 9 between the backup plates 174 and the sealing diaphragm 200. One spring assembly 196, 188 and one sealing diaphragm 200 are disposed on either side of the backup plates 174.

During operation of the power plant, the pressure of the gases passing through the sector opening 184 are substantially greater than the pressure of the gases passing through sector opening 186. However, the elliptical sealing diaphragms 200 define a bellows which is adapted to expand and to exert a sealing force against the graphite sector plates and the stationary housing shoulders. As the pressure differential between the power plant intake air and exhaust gases increases, the sealing force is correspondingly increased by virtue of this inherent bellows effect.

Since the peripheral spring elements surrounding each of the regenerator seal sector springs will normally be subjected to repeated deflection as the vehicle encounters road shocks and the like, they are designed so that the bending stresses produced in the individual spring leaves are evenly distributed throughout the radial width thereof. This even stress distribution is accomplished by virtue of the curved, unloaded configuration of the springs as above described. As the marginal portion of the individual leaf springs is deflected, the body portion of the individual spring leaf contacts the backup plate to which they are secured and, accordingly, the springs will tend to lie against the backup plate until a limiting position is reached, said limiting position being shown in Figure 5 by means of dotted lines. The stress at any one location on the spring leaves therefore will not exceed a predetermined value. The magnitude of this predetermined maximum stress may be chosen so that the springs will not be readily subject to fatigue failure.

What I claim and desire to secure by United States Letters Patent is:

1. In a rotary regenerator mechanism for a gas turbine power plant comprising a circular matrix structure with a hub and a peripheral rim, said regenerator being rotatably mounted within a housing structure; a graphite sector plate slidably disposed in sealing engagement with an axial side of said regenerator, said sector plate being characterized by a peripheral rim portion and a hub portion which are adapted to slidably engage the rim and hub for said regenerator respectively, said sector plate further including a pair of sector arms interconnecting the hub and rim portions thereof and defining in part a first and a second sector opening in said plate, a seal supporting backup plate having substantially the same size and shape as said graphite sector plate, said backup plate having sector arms, a hub and a peripheral rim which define a pair of sector openings corresponding to said first and second sector plate openings, a flexible diaphragm seal encircling one of said backup plate openings and having a central aperture larger in area than the area of said first sector plate opening, said diaphragm seal being secured to said backup plate along a marginal portion of the seal with the inner marginal edge thereof being free to deflect away from the surface of said backup plate, and spring means distinct from said sealing diaphragm for biasing the innermost marginal portion of the latter away from said backup plate to provide a sealing engagement between the inner peripheral edge of said sealing diaphragm and said graphite sector plate, said inner peripheral edge of said sealing diaphragm encircling said first sector plate opening.

2. In a rotary regenerator mechanism for a gas turbine power plant comprising a circular matrix structure with a hub and a peripheral rim, said regenerator being rotatably mounted within a housing structure; a graphite sector plate slidably disposed in sealing engagement with an axial side of said regenerator, said sector plate being characterized by a peripheral rim portion and a hub portion which are adapted to slidably engage the rim and hub for said regenerator respectively, said sector plate further including a pair of sector arms interconnecting the hub and rim portions thereof and defining in part a first and a second sector opening in said plate, a seal supporting backup plate having substantially the same size and shape as said graphite sector plate, said backup plate having sector arms, a hub and a peripheral rim which define a pair of sector openings corresponding to said first and second sector plate openings, a diaphragm seal encircling one of said backup plate openings and having a central aperture larger in area than the area of said first sector plate opening, said diaphragm seal being secured to said backup plate along an outer marginal portion of the seal with the inner marginal edge thereof being free to deflect away from the surface of said backup plate, and spring means distinct from said sealing diaphragm for biasing the innermost marginal portion of the latter away from said backup plate to provide a sealing engagement between the inner peripheral edge of said sealing diaphragm and said graphite sector plate, said inner peripheral edge of said sealing diaphragm encircling said first sector plate opening, said spring means further including a peripheral leaf spring encircling at least a portion of said other backup plate sector opening, said peripheral leaf spring being secured to said backup plate at a location intermediate the inner and outer marginal portion thereof, at least one of said marginal portions being free to deflect away from the surface of said backup plate.

3. In a rotary regenerator mechanism for a fuel combustion apparatus comprising a circular matrix structure with a hub and a peripheral rim, a housing having said regenerator rotatably mounted therein, a graphite sector plate slidably disposed in sealing engagement with an axial side of said regenerator, said sector plate being characterized by a peripheral rim portion and a hub portion which are adapted to slidably engage the rim and hub for said regenerator respectively, said sector plate further including a pair of sector arms interconnecting the hub and rim portion thereof and defining in part a first and a second sector opening in said plate, a seal supporting and backup plate for said graphite plate having substantially the same size and shape as said graphite plate, said backup plate being flat and having flat sector arms, a flat hub and a flat peripheral rim which define a pair of sector openings corresponding to said first and second sector plate openings, a pair of flexible diaphragm seals encircling one of said backup plate openings and having a central aperture larger in area than the area of said first sector plate opening, one of said diaphragm seals being secured to each side of said backup plate along an outer marginal portion of the seal with the inner marginal edges thereof being normally displaced away from the plane of said backup plate, and spring means between each sealing diaphragm and said backup plate biasing the innermost marginal portions of said sealing diaphragms away from said backup plate into sealing engagement with said graphite sector plate and a juxtaposed portion of said housing, and said spring means being compressed substantially flat against said backup plate between said housing and graphite sector plate.

4. In a rotary regenerator mechanism for a fuel combustion apparatus comprising a circular matrix structure with a hub and a peripheral rim, a housing having said regenerator rotatably mounted therein, a graphite sector plate slidably disposed in sealing engagement with an axial side of said regenerator, said sector plate being characterized by a peripheral rim portion and a hub portion slidably engaging the rim and hub for said regenerator respectively, said sector plate further including a pair of sector arms interconnecting the hub and rim portion thereof and defining in part a first and a second sector opening in said plate, a seal supporting back-up plate having substantially the same size and shape as said graphite sector plate, said back-up plate being flat and having flat sector arms, a flat hub and a flat peripheral rim which define a pair of sector openings mating with said first and second sector plate openings, a pair of flexible diaphragm seals encircling one of said back-up plate openings and having a central aperture larger in area than the area of said first sector plate opening, each of said diaphragm seals being secured to one of each of the sides of said back-up plate along an outer marginal portion of the seal with the inner marginal edges thereof being normally displaced away from the plane of said back-up plate, and spring means between each sealing diaphragm and said back-up plate biasing the innermost marginal portions of said sealing diaphragms away from said back-up plate into sealing engagement with said graphite sector plate and a juxtaposed portion of said housing, and a pair of peripheral leaf springs encircling at least a portion of said other back-up plate sector opening at opposite sides of said back-up plate, said peripheral leaf springs being secured at a location intermediate its inner and outer margin to said back-up plate, at least one of said margins being free to deflect away from the surface of said back-up plate, and said spring means being compressed substantially flat against said backup plate between said housing and graphite sector plate.

5. In a fuel combustion apparatus, a housing, a regenerator structure rotatably mounted within said housing, a graphite sector plate slidably disposed in sealing engagement with an axial side of said regenerator structure, said sector plate having a first and a second sector opening therein, a seal supporting and back-up plate for said graphite sector plate having substantially the same size and shape as said graphite sector plate and including a pair of sector openings corresponding to said first and second sector plate openings, a flexible diaphragm seal encircling one of said back-up plate openings and being secured to said back-up plate with a marginal edge thereof being free to deflect away from the surface of said back-up plate, and spring means between said sealing diaphragm and back-up plate for biasing said marginal edge of said sealing diaphragm away from said back-up plate into sealing engagement with said graphite sector plate, said spring means comprising a peripheral leaf spring structure encircling said one sector plate opening and being secured to said back-up plate.

6. The combination as set forth in claim 5 wherein said leaf spring structure includes two superimposed spring leaf elements secured to said back-up plate and having marginal portions in their unstressed condition extending away from said back-up plate to bias said marginal edge of said diaphragm seal into sealing engagement with said sector plate.

7. In a rotary regenerator mechanism for a gas turbine power plant comprising a circular matrix structure with a hub and a peripheral rim, said regenerator being rotatably mounted within a housing structure; a graphite sector plate slidably disposed in sealing engagement with an axial side of said regenerator, said sector plate being characterized by a peripheral rim portion and a hub portion which are adapted to slidably engage the rim and hub for said regenerator respectively, said sector plate further including a pair of sector arms interconnecting the hub and rim portions thereof and defining in part a first and a second sector opening, a seal supporting backup plate for said graphite sector plate having substantially the same size and shape as said graphite sector plate and including sector arms, a hub and a peripheral rim which define a pair of sector openings mating with said first and second sector plate openings, the juxtaposed surfaces of said backup and sector plates substantially conforming in contour to each other, a thin flexible diaphragm seal encircling one of said backup plate openings and being secured to said backup plate along an outer marginal portion of the seal with the inner marginal edge thereof being free to deflect away from the plane of said backup plate, spring means distinct from said sealing diaphragm for biasing the innermost marginal portion of said sealing diaphragm away from said backup plate to provide a sealing engagement between the inner peripheral edge of said sealing diaphragm and said graphite sector plate, said inner peripheral edge of said sealing diaphragm encircling said first sector plate opening, said spring means further including a peripheral leaf spring encircling at least a portion of said other backup plate sector opening, said peripheral leaf spring being secured to said backup plate at a location intermediate the inner and outer marginal portions thereof, at least one of said marginal portions being free to deflect away from the surface of said backup plate, at least one of said peripheral leaf spring marginal portions being formed with an initial curvature with the convex surface thereof contacting said backup plate.

8. The combination as set forth in claim 7 wherein said one marginal portion is slotted to form a plurality of adjacent leaf spring elements.

9. In a rotary regenerator mechanism for a fuel combustion apparatus comprising a circular matrix structure with a hub and a peripheral rim, a housing having said regenerator rotatably mounted therein, a graphite sector plate slidably disposed in sealing engagement with an axial side of said regenerator, each of said sector plates being characterized by a peripheral rim portion and a hub portion which are adapted to slidably engage the rim and hub for said regenerator respectively, said sector plate further including a pair of sector arms interconnecting the hub and rim portion thereof and defining in part a first and a second sector opening in said plate, a seal supporting backup plate having substantially the same size and shape as said graphite center plate and including sector arms, a hub and a peripheral rim which define a pair of sector openings corresponding to said first and second sector plate openings, the juxtaposed surfaces of said backup and sector plates substantially conforming in contour to each other, a pair of thin flexible diaphragm seals encircling one of said backup plate openings, each having a central aperture larger in area than the area of said first sector plate opening, each diaphragm seal being secured to one of each of the opposite sides of said backup plate along an outer marginal portion of the seal with the inner marginal edges thereof being normally displaced away from the surface of said backup plate, and spring means between each sealing diaphragm and backup plate for biasing the innermost marginal portions of said sealing diaphragms away from said backup plate and into sealing engagement with said graphite sector plate and with a juxtaposed portion of said housing, said spring means including a pair of peripheral leaf springs encircling at least a portion of said other backup plate sector opening at opposite sides of said backup plate, said peripheral leaf springs being secured to said backup plate at a location intermediate the inner and outer margins thereof, at least one of said margins being free to deflect away from the surface of said backup plate, said spring means further including a second pair of peripheral leaf springs encircling said one backup plate second opening, said sector leaf springs being secured to said second backup plate at opposite sides thereof along a line which is spaced from the inner peripheral edges of said diaphragm seals with one marginal portion of each of said second leaf springs being free to deflect away from the surface of said backup plate, said one marginal portion having an initial curvature with the convex surface thereof contacting said backup plate and said spring means being under compression between said housing and graphite sector plate.

10. In a fuel combustion apparatus having a rotating regenerator structure adapted for passage of separate streams of gases through separate portions thereof, an anti-friction plate in sliding engagement with one axial side of said structure and having an opening for passage of one of said streams of gases into said structure, a backup plate adjacent the first plate and having an opening registering with the first opening, a flexible diaphragm seal secured to said backup plate and interposed between the latter and said first plate, said seal having an opening registering with the openings in said plates and also having a free marginal edge adapted to be deflected axially from said backup plate, spring means between said backup plate and seal biasing said edge from said backup plate into sealing engagement with said first plate, and separate gas passage means for said separate streams respectively, one being in communication with said registering openings and the other being in communication with said one axial side of said regenerator structure adjacent and exteriorly of said registering openings.

11. In a fuel combustion apparatus having a rotating regenerator structure adapted for passage of separate streams of gases through separate portions thereof, an anti-friction plate in sliding engagement with one axial side of said structure and having an opening for passage of one of said streams of gases into said structure, a backup plate adjacent the first plate and having an opening registering with the first opening, a flexible diaphragm seal secured to said backup plate around said opening therein and interposed between the latter and said first plate, said seal having an opening registering with the openings in said plates and also having a free marginal edge around its opening adapted to be deflected axially from said backup plate, spring means between said backup plate and seal biasing said edge from said backup plate into sealing engagement with said first plate, said spring means being secured to said backup plate and being arranged around the opening therein, and separate gas passage means for said separate streams respectively, one being in communication with said registering openings and the other being in communication with said one axial side of said regenerator structure adjacent and exteriorly of said registering openings.

12. In a fuel combustion apparatus having a rotating regenerator structure adapted for passage of separate streams of gases through separate portions thereof, an anti-friction plate in sliding engagement with one axial side of said structure and having an opening for passage of one of said streams of gases into said structure, a backup plate adjacent the first plate and having an opening registering with the first opening, a flexible diaphragm seal secured to said backup plate around said opening therein and interposed between the latter and said first plate, said seal having an opening registering with the openings in said plates and also having a free marginal edge around its opening adapted to be deflected axially from said backup plate, spring means between said backup plate and seal biasing said edge from said backup plate into sealing engagement with said first plate, said spring means comprising a plurality of spring leaves arranged around the opening in said backup plate and having free edges extending toward said free marginal edge of said seal, and separate gas passage means for said separate streams respectively, one being in communication with said registering openings and the other being in communication with said one axial side of said regenerator structure adjacent and exteriorly of said registering openings.

13. In a fuel combustion apparatus having a rotating regenerator structure adapted for passage of separate streams of gases through separate portions thereof, an anti-friction plate in sliding engagement with one axial side of said structure and having an opening for passage of one of said streams of gases into said structure, a backup plate adjacent the first plate and having an opening registering with the first opening, a thin flexible diaphragm seal secured to said backup plate around said opening therein and interposed between the latter and said first plate, said seal having an opening registering with the openings in said plates and also having a free marginal edge around its opening adapted to be deflected axially from said backup plate, spring means between said backup plate and seal biasing said edge from said backup plate into sealing engagement with said first plate, said spring means comprising a plurality of spring leaves arranged around the opening in said backup plate and being secured thereto at locations spaced from said free marginal edge of said seal, each spring leaf having a free edge extending toward said free marginal edge of said seal, and separate gas passage means for said separate streams respectively, one being in communication with said registering openings and the other being in communication with said one axial side of said regenerator structure adjacent and exteriorly of said registering openings.

14. In a fuel combustion apparatus having a rotating regenerator structure adapted for passage of separate streams of gases through separate portions thereof, an anti-friction plate in sliding engagement with one axial side of said structure and having an opening for passage of one of said streams of gases into said structure, a backup plate adjacent the first plate and having an opening registering with the first opening, a diaphragm seal secured to said backup plate around said opening therein and interposed between the latter and said first plate, said seal having an opening registering with the openings in said plates and also having a free marginal edge around its opening adapted to be deflected axially from said backup plate, spring means between said backup plate and seal biasing said edge from said backup plate into sealing engagement with said first plate, said spring means comprising a plurality of spring leaves arranged around the opening in said backup plate and being secured thereto at locations spaced from said free marginal edge of said seal, each spring leaf having a free edge extending toward and terminating short of said free marginal edge of said seal, and the latter comprising thin flexible sheet material, and separate gas passage means for said separate streams respectively, one being in communication with said registering openings and the other being in communication with said one axial side of said regenerator structure adjacent and exteriorly of said registering openings.

15. In a fuel combustion apparatus having a rotating regenerator structure adapted for passage of separate streams of gases through separate portions thereof, an anti-friction plate in sliding engagement with one axial side of said structure and having an opening for passage of one of said streams of gases into said structure, a backup plate adjacent the first plate and having an opening registering with the first opening, a diaphragm seal secured to said backup plate around said opening therein and interposed between the latter and said first plate, said seal having an opening registering with the openings in said plates and also having a free marginal edge around its opening adapted to be deflected axially from said backup plate, spring means between said backup plate and seal biasing said edge from said backup plate into sealing engagement with said first plate, said spring means comprising a double layer of spring leaves arranged around the opening in said backup plate and secured thereto at locations spaced from said free marginal edge of said seal, the space between each pair of juxtaposed spring leaves in each layer being overlapped by a spring leaf in the other layer, and separate gas passage means for said separate streams respectively, one being in communication with said registering openings and the other being in communication with said one axial side of said regenerator structure adjacent and exteriorly of said registering openings.

16. In a fuel combustion apparatus having a rotating regenerator structure adapted for passage of separate streams of gases through separate portions thereof, an anti-friction plate in sliding engagement with one axial side of said structure and having an opening for passage of one of said streams of gases into said structure, a backup plate adjacent the first plate and having an opening registering with the first opening, a diaphragm seal secured to said backup plate around said opening therein and interposed between the latter and said first plate, said seal having an opening registering with the openings in said plates and also having a free marginal edge around its opening adapted to be deflected axially from said backup plate, spring means between said backup plate and seal biasing said edge from said backup plate into sealing engagement with said first plate, said spring means comprising a double layer of spring leaves arranged around the opening in said backup plate and secured thereto at locations spaced from said free marginal edge of said seal, the space between each pair of juxtaposed spring leaves in each layer being overlapped by a spring leaf in the other layer, each spring leaf having a free edge extending toward and terminating short of said free marginal edge of said seal, and the latter comprising thin flexible sheet material, and separate gas passage means for said separate streams respectively, one being in communication with said registering openings and the other being in communication with said one axial side of said regenerator structure adjacent and exteriorly of said registering openings.

17. In a fuel combustion apparatus comprising a housing, a rotating regenerator structure mounted within said housing, said housing having a wall structure defining separate openings registering with separate portions of said regenerator structure for discharging separate gas streams at different pressures into said separate portions respectively, an anti-friction plate having an opening registering with one of the first-named openings and being in sealing and sliding engagement with said regenerator structure around the registering openings, a pair of flexible diaphragm seals having openings registering with the aforesaid registering openings and confronting said wall structure and plate respectively, each diaphragm seal having a free marginal inner edge extending around and directed toward its opening and being adapted to be deflected away from the free marginal edge of the other seal, a pair of spring means associated with said seals respectively and interposed therebetween around said registering openings, each spring means having a free inner edge around the opening in the associated seal and being under tension biasing the free marginal edge of the associated seal away from the free marginal edge of the other seal and into sealing engagement with said plate and wall structure respectively, and means securing the outer portions of said spring means together.

18. In a fuel combustion apparatus comprising a housing, a rotating regenerator structure mounted within said housing, said housing having a wall structure defining separate openings registering with separate portions of said regenerator structure at an axial side thereof for discharging separate gas streams at different pressures into said separate portions respectively, an anti-friction plate having an opening registering with one of the first-named openings and being in sealing and sliding engagement with said regenerator structure around the registering openings, a pair of flexible diaphragm seals having openings registering with the aforesaid registering openings and confronting said wall structure and plate respectively, each diaphragm seal having a free marginal inner edge extending around and directed toward its opening and being adapted to be deflected away from the free marginal edge of the other seal, a pair of leaf spring means associated with said seals respectively and interposed therebetween around said registering openings, each spring means having a free inner edge portion around the opening in the associated seal and being adapted to extend in its unstressed condition away from the corresponding free inner edge portion of the other seal, means securing said spring means together outwardly of their free inner edge portions, the inner edge portions of said spring means in their assembled condition being substantially flattened against their associated diaphragm seals to hold the latter under tension flat against said plate and wall structure respectively in sliding and sealing engagement therewith.

19. The combination according to claim 18 wherein each spring means comprises a plurality of spring leaves arranged around the opening in the associated diaphragm seal, each spring leaf having a free edge extending toward and terminating short of the free marginal edge of the associated diaphragm seal, the latter comprising thin flexible sheet material.

20. The combination according to claim 18 wherein each spring means comprises a double layer of spring leaves arranged around the opening in the associated diaphragm seal, the space between each pair of juxtaposed spring leaves in each layer being overlapped by a spring leaf in the other layer.

21. The combination according to claim 18 wherein each spring means comprises a double layer of spring leaves arranged around the opening in the associated diaphragm seal, the space between each pair of juxtaposed spring leaves in each layer being overlapped by a spring leaf in the other layer, each spring leaf having a free inner edge extending toward and terminating short of the free marginal edge of the associated diaphragm seal, the latter comprising thin flexible sheet material.

References Cited in the file of this patent

UNITED STATES PATENTS

| 1,859,573 | Riley | May 24, 1932 |
| 2,667,034 | Alcock | Jan. 26, 1954 |

FOREIGN PATENTS

| 702,158 | Great Britain | Jan. 13, 1954 |
| 265,297 | Switzerland | Feb. 16, 1950 |